United States Patent [19]

Schaenzer et al.

[11] Patent Number: 5,755,612
[45] Date of Patent: May 26, 1998

[54] SMALL FOOT MACHINING GUIDE FOR RECORDING HEADS

[75] Inventors: Mark J. Schaenzer, Eagan; Beat G. Keel, Prior Lake; Lance E. Stover, Eden Prairie; Shanlin X. Hao, St. Paul, all of Minn.

[73] Assignee: Seagate Technology, Inc., Scotts Valley, Calif.

[21] Appl. No.: 738,693

[22] Filed: Oct. 28, 1996

[51] Int. Cl.$^6$ ................................. B24B 49/02; B24B 49/10
[52] U.S. Cl. ...................... 451/5; 451/1; 29/603.16; 360/113; 360/103
[58] Field of Search .............. 451/5, 9, 10; 29/603.15, 29/603.16, 603.01; 360/103, 113

[56] References Cited

U.S. PATENT DOCUMENTS

| | | | |
|---|---|---|---|
| 4,457,114 | 7/1984 | Hennenfent et al. | 51/216 R |
| 4,477,968 | 10/1984 | Kracke et al. | 29/603 |
| 4,536,992 | 8/1985 | Hennenfent et al. | 51/109 R |
| 4,559,743 | 12/1985 | Kracke et al. | 51/165 R |
| 4,675,986 | 6/1987 | Yen | 29/603 |
| 4,689,877 | 9/1987 | Church | 29/603 |
| 4,912,883 | 4/1990 | Chang et al. | 51/165 |
| 5,023,991 | 6/1991 | Smith | 29/603 |
| 5,361,547 | 11/1994 | Church et al. | 451/5 |
| 5,463,805 | 11/1995 | Mowry et al. | 451/1 |
| 5,494,473 | 2/1996 | Dupuis et al. | 451/1 |
| 5,597,340 | 1/1997 | Church et al. | 451/5 |

OTHER PUBLICATIONS

G.P. Carver, L.W. Linholm, and T.J. Russell, "Use of Microelectronic Test Structures to Characterize IC Materials, Processes, and Processing Equipment*" *Solid State Technology*, Sep. 1990, pp. 85–92.

*Primary Examiner*—Robert A. Rose
*Attorney, Agent, or Firm*—Westman, Champlin & Kelly, P.A.

[57] ABSTRACT

An electrical lap guide (ELG) for use in lapping a bar of magnetic transducer carrying sliders to a desired height is disclosed. A first lapped or analog ELG element is positioned in a first dice lane on the bar between first and second sliders. A first electrical connection is positioned on a surface of the first dice lane for coupling the first ELG element to external circuitry. A second reference ELG element is positioned in the first slider at a position recessed from the lapped surface. A second electrical connection is positioned on the first slider for coupling the second ELG element to external circuitry.

19 Claims, 3 Drawing Sheets

SMALL FOOT MACHINING GUIDE FOR RECORDING HEADS

BACKGROUND OF THE INVENTION

The present application herein incorporates by reference U.S. Pat. No. 5,023,991 issued to Alan Smith on Jun. 18, 1991 and entitled ELECTRICAL GUIDE FOR TIGHT TOLERANCE MACHINING, and co-pending and commonly assigned U.S. patent application Ser. No. 08/629,524 to Stover et al. filed on Apr. 10, 1996 and entitled MACHINING GUIDE FOR MAGNETIC RECORDING REPRODUCE HEADS.

The present invention relates generally to the fabrication of sliders for carrying magnetoresistive (MR) and/or inductive sensors or transducers for data storage applications, and more particularly, to an improved electrical lap guide (ELG) for controlling the machining process such that the transducers are machined to a specified height.

During the fabrication of magnetic transducer carrying sliders for use in magnetic data storage systems, an array of sliders is fabricated on a common substrate in a deposition of metallic and nonmetallic layers. Typically, resistive or other elements which function as electrical lap guides (ELGs) are also fabricated in the deposition of layers for use in lapping or machining the sliders. ELGs of various types are well known in the art. See for example, U.S. Pat. No. 5,023,991 which issued to Alan Smith on Jun. 18, 1991.

Patterning of the sliders (including the magnetic transducers) and ELGs is accomplished using photolithography in combination with etching and lift-off processes. The finished wafer is then optically and electrically inspected and subsequently cut into smaller arrays, known as rows or bars. Next, the individual rows or bars of sliders are machined, at a surface which will eventually face the recording medium (i.e., the air bearing surface or ABS), to obtain a desired MR transducer height (sometimes referred to as the stripe height SH) or to obtain a desired inductive transducer height (sometimes referred to as the throat height TH).

During machining of a particular bar of transducers and ELGs, the machined surface moves from a beginning position to a final position, while reducing the height of the transducers. The primary function of the one or more ELGs is to control the machining process such that the desired transducer height is achieved. After a particular bar of sliders is machined to the desired transducer height as controlled by the ELGs, the bar is cut or diced into individual sliders. During this process, the ELGs can be destroyed if desired.

Typically, each ELG includes one or more resistors or elements which are fabricated in the deposition of layers along with the sliders. A very simple ELG design has one resistor which is aligned with a transducer such that the machining process reduces the height of both the transducer and the resistor at the same time. The resistance of the machined resistor (frequently referred to as the analog resistor) is monitored to determine when the desired height of the transducer has been achieved so that the machining process can be halted at this point. A more complex ELG design includes two resistors, one machined (analog) and the other a non-machined reference resistor. The resistance of the machined resistor is compared to the constant resistance of the reference resistor during the machining process. When the resistance of the machined resistor equals the resistance of the reference resistor, the machining process is halted, presumably at the point where the height of the machined resistor is approximately equal to the desired transducer height. ELG designs having three or more resistors are also possible.

Frequently, the individual elements or resistors of an ELG are located in portions of the bar to be machined which are known as dice lanes. Dice lanes are regions between adjacent sliders on the bar which are necessary so that the bar can be diced or cut into individual sliders without dicing into a portion of the sliders. Typically, ELG components located in a dice lane are destroyed when the bar is diced into individual sliders. However, since the dicing step occurs after the lapping or machining step, this is of no consequence.

Currently, many ELG configurations cause problems in the machining process or result in limitations in the process results. For example, as a trend in the industry continues toward producing more sliders per bar, the space reserved for the dice lanes has been reduced considerably. Frequently, there is insufficient space available in the dice lane for all of the components of the ELG and for the electrical connections needed to access these components. Further, in ELG designs in which the components of the ELG are located within a slider, as opposed to being located within a dice lane, available space is at a premium as well. While there may be adequate space available within the slider for the components of the ELG in some side-rail type sliders, often there will be insufficient space in center-rail type sliders. Further, inclusion of the analog or machined resistor in the slider can result in exposed metal and photoresist contamination at the ABS of the slider. Consequently, there is a need for an ELG which overcomes these problems and limitations.

SUMMARY OF THE INVENTION

An electrical lap guide (ELG) for use in lapping a bar of magnetic transducer carrying sliders to a desired height is disclosed. A first lapped or analog ELG element is positioned in a first dice lane on the bar between first and second sliders. A first electrical connection is positioned on a surface of the first dice lane for coupling the first ELG element to external circuitry. A second reference ELG element is positioned in the first slider at a position recessed from the lapped surface. A second electrical connection is positioned on the first slider for coupling the second ELG element to external circuitry.

DETAILED DESCRIPTION OF THE PREFERRED EMBODIMENTS

Figure 1:
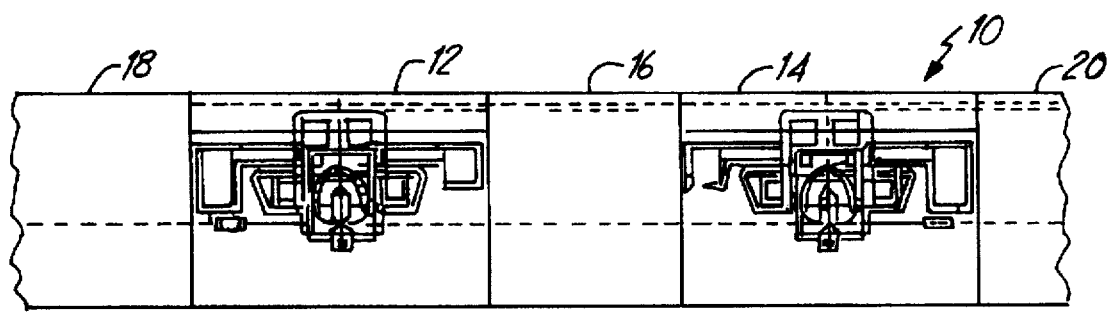
FIG. 1 is a diagrammatic view in perspective of a bar of sliders which is to be lapped or machined to achieve a desired height of the MR or inductive transducers.

FIG. 1 is diagrammatic view of bar 10 of sliders which is to be lapped or machined to obtain desired transducer heights. Although in FIG. 1 bar 10 is shown to include only sliders 12 and 14 separated by dice lane 16, it should be understood that bar 10 will typically include a large number of sliders and dice lanes. For example, sliders are typically positioned on the other sides of dice lanes 18 and 20, opposite sliders 12 and 14. As is well-known in the art, ELGs are used to control the machining process while a surface of bar 10 is machined from a beginning surface to a final surface in order to reduce the height of transducers on the sliders to a desired transducer height. The components of the ELG (not shown in FIG. 1) have conventionally been placed in the area of dice lane 16. If multiple ELGs were desired for controlling the machining process, additional ELGs were typically located in other dice lanes, such as in dice lanes 18 and 20.

In order to increase the number of sliders available on each bar, the trend in the industry has been to reduce the width of the dice lanes. Thus, there is frequently insufficient space available in a particular dice lane for the studs or electrical connections necessary to electrically access the components of the ELG. Similarly, in ELG designs such as the one disclosed by Smith in U.S. Pat. No. 5,023,991, the components of the ELG have been placed in the center region of a side-rail type slider. However, as the dimensions of the sliders themselves continue to decrease, it becomes increasingly more difficult to place an ELG in this position. In center-rail type sliders such as the ones illustrated in FIG. 1, there is frequently less available space for an ELG than is available in side-rail type sliders. Further, it is undesirable to introduce the metal of the ELG analog (lapped) components at the ABS of the slider. Also, photoresist contamination which can result from the ELG analog component fabrication process is highly detrimental at the ABS, particularly for inductive type transducer sliders. For inductive transducers, it is preferable not to have any switches (analog or lapped resistors) on the slider at all because of the photoresist contamination.

Figure 2:
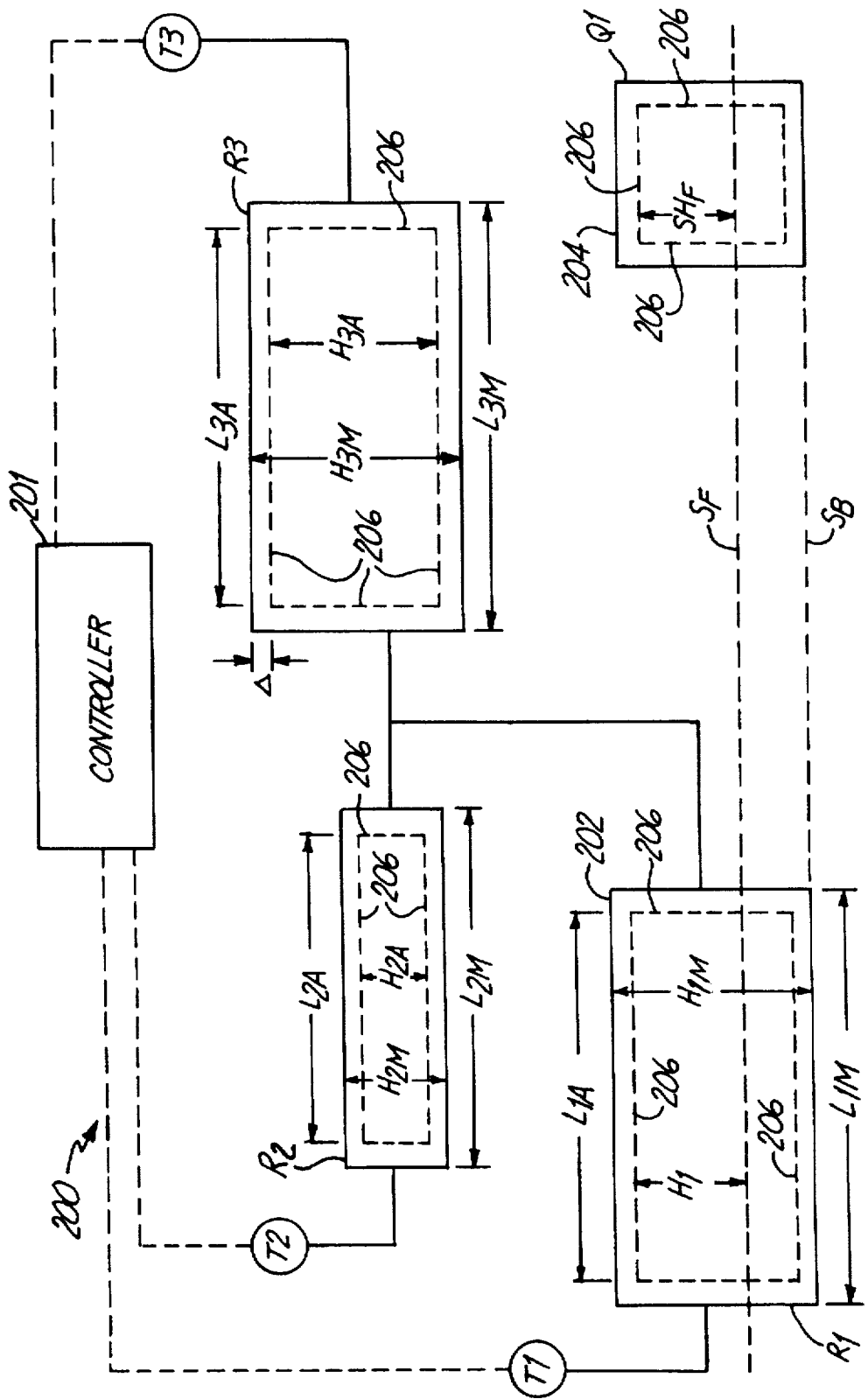
FIG. 2 is a diagrammatic view of a three resistor or element ELG which is used to control the machining process to obtain a desired MR transducer height.

FIG. 2 is a diagrammatic illustration of ELG 200 which can be used to control the machining process to obtain the desired or intended final height $SH_F$ of MR transducer Q1. ELG 200 is an example of a three resistor ELG which accurately and reliably takes into account the effects of wafer process edge movement while controlling the machining process to obtain the desired transducer height. ELG 200 provides the ability to determine the accuracy or reliability of the ELG design. It must be noted that ELG 200 represents only one of many possible three resistor ELG designs. Further, while ELG 200 takes in account the effects of edge movement on the transducer height, many ELGs do not. Also, while ELG 200 is illustrated as an MR transducer ELG, it can be adapted for use with inductive transducers as well. The specific features of ELG 200 are provided as an example of an ELG which can be implemented according to the present invention. However, the specific details of ELG 200 are not intended to limit the invention.

ELG 200 includes first or analog resistor R1, reference resistor R2, and additional reference resistor R3. In preferred embodiments, resistors R1, R2 and R3 are connected to each other as shown and to electrical terminals T1, T2 and T3 such that the resistances of each of the three resistors can be measured or determined from a series of resistance measurements. However, in other embodiments, still other configurations and numbers of electrical terminals can be used to ensure that the resistances of each of the three resistors of ELG 200 can be measured or determined.

In some preferred embodiments, ELG 200 also includes controller 201 which is not located on the bar of sliders. In other embodiments, controller 201 is used in conjunction with ELG 200 as part of an ELG or lapping system. Controller 201 is coupleable to each of electrical terminals T1, T2 and T3. In preferred embodiments, controller 201 is a microprocessor based control device having associated memory and associated input/output circuitry and devices. However, in other embodiments, controller 201 can be any of a variety of analog or digital based circuits or components adapted for measuring the resistances of resistors R1, R2 and R3 and for controlling the machining process as a function of the measured resistances to achieve the desired machined height of MR transducer Q1. Although not expressly stated throughout, it should be understood that controller 201 performs the various calculations and functions required in methods discussed below.

Analog resistor R1 of ELG 200 is preferably aligned with MR transducer Q1 of at least one slider such that rear surface 202 of resistor R1 lies in the same plane as rear surface 204 of MR transducer Q1. The machining or lapping process begins at or near beginning surface $S_B$ and is continued until final surface $S_F$ is reached. Final surface $S_F$ typically corresponds to the ABS of the sliders in the bar. Ideally, the machining process is controlled such that machined resistor height $H_1$ of resistor R1 is equal to some predetermined value at which final height $SH_F$ of MR transducer Q1 is equal to its desired level. Reference resistors R2 and R3 are preferably, but not necessarily recessed from the machined surface.

Edge movement (denoted by quantity $\Delta$ in FIG. 2) of edge surfaces of resistors R1, R2 and R3 and of MR transducer Q1 changes the dimensions of these components. As shown in FIG. 2, the quantity $\Delta$ of edge movement is assumed to be approximately equal for each of the components. Further, it is assumed that quantity $\Delta$ of edge movement is approximately the same in the height and length directions.

Resistor R1 has intended or mask length $L_{1M}$ and an actual length $L_{1A}$ which is less than mask length $L_{1M}$ by $2\Delta$. Likewise, resistor R1 has un-machined mask height $H_{1M}$, which would be the un-machined height of resistor R1 if not for edge movement. Resistor R2 has intended or mask length $L_{2M}$ and actual length $L_{2A}$ which is less than the mask length by $2\Delta$. Likewise, resistor R2 has mask height $H_{2M}$ and actual height $H_{2A}$. Resistor R3 has mask and actual lengths $L_{3M}$ and $L_{3A}$, and mask and actual heights $H_{3M}$ and $H_{3A}$.

Typically resistors also have edge movement in the length direction as shown in FIG. 2. However, since the quantity of edge movement is very small relative to typical resistor lengths, it can be neglected and the resistor lengths can be assumed to be process insensitive. Furthermore, by making $L_3*H_2=L_2*H_3$, the calculation of sheet resistance Q and edge movement $\Delta$ discussed below are made insensitive to small and equal changes in $L_2$ and $L_3$.

As discussed previously, ELGs of the type illustrated in FIG. 2 control final machined height $SH_F$ of MR transducer Q1 by monitoring or controlling machined height $H_1$ of resistor R1. Typically, this is done by measuring and monitoring resistance $R_1$ of resistor R1 during the machining process. ELG 200 compensates or accounts for edge movement in order to minimize machining errors.

If sheet resistance Q of deposition of layers 12 is known, machined height $H_1$ of resistor R1 can be determined using the relationship described in Equation 1.

$$R_1 = \frac{Q \cdot L_1}{H_1} \qquad \text{Equation 1}$$

-continued where, $R_1$ = measured resistance of resistor $R1$ $L_1$ = effective length of resistor $R1$ = $L_{1M} - 2\Delta = L_{1A}$ ≈ $L_{1M}$ when $L_{1M} \gg \Delta$ $H_1$ = machined height of resistor $R1$ Sheet resistance Q can be determined in a variety of manners. For example, sheet resistance Q can be determined by measuring resistance $R_2$ of reference resistor R2 and using the relationship described below in Equation 2.

$$R_2 = \frac{Q \cdot L_2}{H_{2M} - 2 \cdot \Delta}$$ Equation 2

$R_2$ = measured resistance of resistor $R2$ $L_2$ = effective length of resistor $R2$ = $L_{2M} - 2\Delta = L_{2A}$ ≈ $L_{2M}$ when $L_{2M} \gg \Delta$ $H_{2M}$ = mask height of resistor $R2$ Since amount or quantity Δ of edge movement is not known, sheet resistance Q can be estimated using Equation 2 if mask height $H_{2M}$ of resistor R2 is much greater in value than amount Δ of edge movement, by assuming that amount Δ of edge movement is equal to zero. Obviously, determination of sheet resistance Q in this manner introduces errors in the calculations.

ELG 200 includes third resistor R3 to provide a method of determining the value of sheet resistance Q, and to provide a method of determining quantity or amount Δ of wafer processing edge movement. The ability to determine both sheet resistance Q and quantity Δ of edge movement increases the reliability of ELG 200. Since measured resistance $R_3$ of resistor R3 is dependent upon both sheet resistance Q and quantity Δ of edge movement as shown in Equation 3, Equations 2 and 3 can be combined to determine sheet resistance Q and edge movement Δ as shown in Equations 4 and 5.

$$R_3 = \frac{Q \cdot L_3}{H_{3M} - 2\Delta}$$ Equation 3 where, $R_3$ = the measured resistance of resistor $R1$ $L_3$ = the effective length of resistor $R3$ = $L_{3M} - 2\Delta = L_{3A}$ ≈ $L_{3M}$ when $L_{3M} \gg \Delta$ $H_{3M}$ = the mask height of resistor $R3$ $$Q = \frac{H_{3M} - H_{2M}}{\frac{L_3}{R_3} - \frac{L_2}{R_2}}$$ Equation 4

$$\Delta = \frac{L_2 \cdot H_{3M} - \frac{R_2}{R_3} \cdot L_3 \cdot H_{2M}}{2 \cdot \left(L_2 - \frac{R_2}{R_3} \cdot L_3\right)}$$ Equation 5

Note that lengths $L_2$ and $L_3$ of resistors R2 and R3, respectively, can be approximated using mask lengths $L_{2M}$ and $L_{3M}$ when the mask lengths are much greater than quantity Δ of edge movement. Equations 4 and 5 reflect this approximation. However, to reduce errors even further, actual values of lengths $L_2$ and $L_3$, including the effects of edge movement, can be used instead. In other words, length $L_2$ in Equation 2 can be replaced with $L_{2M}-2\Delta$ and length $L_3$ in Equation 3 can be replaced with $L_{3M}-2\Delta$. However, as discussed previously, designing $L_3*H_2=L_2*H_3$ makes calculations of sheet resistance Q insensitive to changes in $L_2$ and $L_3$. This sensitivity is reduced by designing $L_2*H_3 = K_1*L_3*H_2$ (where $0.7<K_1<1.3$).

Further, to reduce errors in the calculations $H_{2M}$ can be designed satisfy the relationship $H_{2M}=K_2H_{3M}$ (where $K_2$ is a constant having a value such that $K_2>2$ or such that $K_2<0.5$). Placing this limitation on the width ratio of resistors R2 and R3 is preferred to reduce calculation errors. Substituting Equation 4 for Q in Equation 1, height $H_1$ of resistor R1 can be determined as shown in Equation 6.

$$H_1 = \frac{H_{3M} - H_{2M}}{\frac{L_3}{R_3} - \frac{L_2}{R_2}} \cdot \frac{L_1}{R_1} = \frac{L_1 \cdot (H_{3M} - H_{2M})}{L_3 \cdot \frac{R_1}{R_3} - L_2 \cdot \frac{R_1}{R_3}}$$ Equation 6

Determination of height $H_1$ of resistor R1 using Equation 6 inherently takes into account the effects of edge movement. Thus, by measuring resistances $R_2$ and $R_3$ of reference resistors R2 and R3 prior to machining, and by monitoring resistance $R_1$ of resistor R1 during machining, the machining process can be controlled using the relationship of Equation 6 to accurately achieve desired height $H_1$ of resistor R1, and thus, desired height $SH_F$ of MR transducer Q1.

As discussed previously, ELGs such as ELG 200 frequently do not fit in the limited space of dice lane 16. Even if sufficient space for the resistors or elements of the ELG exists in a dice lane, frequently there will be insufficient room on the dice lane surface for all of the necessary studs or electrical connections required for accessing the ELG components. While sufficient space for ELG 200 may exist within a slider, it is undesirable to have the machined surface of analog resistor R1 at the ABS of the slider. Further, in inductive transducer type sliders, inclusion of ELG 200 within the slider can result in photoresist contamination (from analog resistor R1) at the ABS of the slider. Therefore, to overcome these limitations and problems of conventional ELG designs, ELG 200 or other ELG designs are implemented according to the present invention as shown by way of example in FIG. 3.

Figure 3:
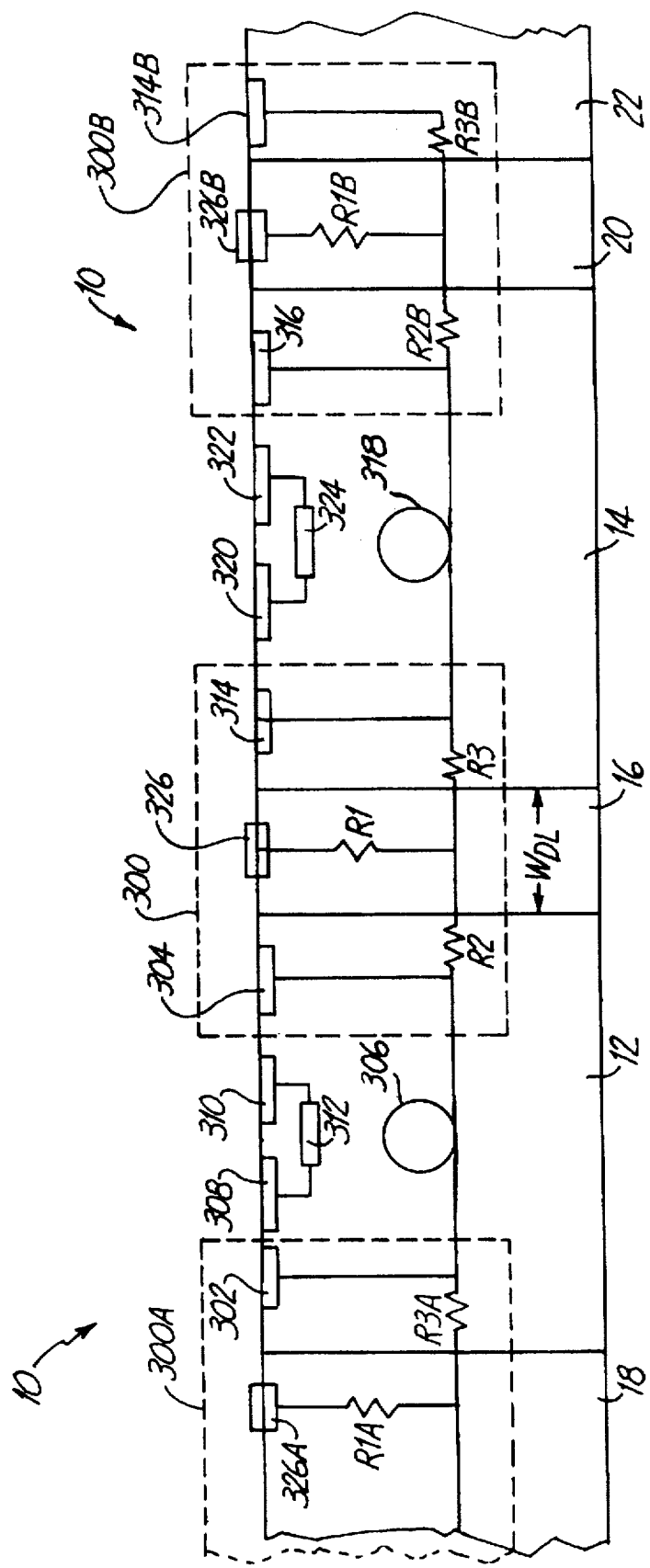
FIG. 3 is a diagrammatic illustration of a bar of sliders to be lapped or machined, which illustrates a three resistor or element ELG configuration in accordance with some preferred embodiments of the present invention.

FIG. 3 is a schematic diagram which illustrates a general configuration of ELG 300 in accordance with preferred embodiments of the present invention. ELG 300 can be a particular implementation of ELG 200, illustrated in FIG. 2, or of other two or more resistor ELG designs. In general, ELG 300 is preferably an implementation of an ELG design having at least one analog (i.e., lapped or machined) resistor or element, and at least one reference (i.e., non-lapped or non-machined) resistor or element.

As shown in FIG. 3, bar 10 includes multiple sliders (only sliders 12, 14 and 22 are shown) separated dice lanes (only dice lanes 16, 18 and 20 are shown). Sliders 12, 14 and 22 illustrated in FIG. 3 are of the type having an inductive transducer and an MR transducer. Inductive transducer 306 is electrically coupled to bond pads 302 and 304 as is known in the art. Likewise, MR transducer 312 is electrically coupled to bond pads 308 and 310 as is known in the art. Similarly, inductive transducer 318 of slider 14 is electrically coupled to bond pads 314 and 316, and MR transducer 324 of slider 14 is electrically coupled to bond pads 320 and 322. It must be noted that in FIG. 3, components are shown diagrammatically in order to illustrate their general location. The illustrations shown in FIG. 3 are not intended to limit the present invention to the specific component locations and orientations shown.

ELG 300 includes analog resistor R1 located in dice lane 16 and coupled to stud or electrical connection 326, reference resistor R2 located in slider 12 and coupled to bond pad 304, and reference resistor R3 located in slider 14 and coupled to bond pad 314. Thus, if ELG 300 is used as a particular implementation of ELG 200 shown in FIG. 2, stud 326 would correspond to terminal T1, bond pad 304 would correspond to terminal T2, and bond pad 314 would correspond to terminal T3.

The configuration of ELG 300 provides numerous advantages over conventional ELG designs. By placing some of the components of ELG 300 in a slider and other components of ELG 300 in a dice lane, the space required for ELG 300 in either the dice lane or the slider is minimized. By placing analog resistor R1 within dice lane 16, no exposed ELG elements or photoresist contamination occur at the ABS of the sliders. Instead, analog resistor R1, which can result in photoresist contamination and metal exposed to the lapped surface, is removed or eliminated during the dicing step.

Reference resistors R2 and R3 of ELG 300 are each preferably located in a different one of sliders 12 and 14 adjacent dice lane 16. In this manner, the space required within each of sliders 12 and 14 for ELG 300 is minimized. However, in other embodiments, each of reference resistors R2 and R3 can be located within the same slider. Also, in embodiments in which ELG 300 is a two resistor ELG, the single reference resistor would be located within a single slider.

A further advantage of ELG 300 is that the number of additional electrical connections required to access ELG 300 is minimized. Resistors R2 and R3 each share a bond pad (bond pads 304 and 314 respectively) with the corresponding inductive transducer on their respective sliders. Stud 326, which requires a large portion of the space taken up by ELG 300, is kept off of sliders 12 and 14 and is included in dice lane 16. Thus, no additional slider surface area is required for the additional electrical connection. Also, by limiting the electrical connections in dice lane 16 to only stud 326, width $W_{DL}$ of dice lane 16 can be dependent upon the dicing process requirements, as opposed to being dependent upon the space requirements of ELG 300. This enables the width of dice lane 16 to be minimized such that more sliders can be produced on each bar. In conventional ELG designs in which multiple studs are placed in a single dice lane, width $W_{DL}$ of the dice lane is typically dependent upon the physical space requirement of ELG 300.

As can be seen in FIG. 3, each of sliders 12 and 14 preferably contains one reference resistor or element of ELG 300. As shown, slider 12 contains reference resistor R2 of ELG 300, while slider 14 contains reference resistor R3 of ELG 300. As can also be seen in FIG. 3, each of sliders 12 and 14 can include a reference resistor from an adjacent ELG. For example, bar 10 can include ELG 300A and ELG 300B which are identical to ELG 300. In this case, slider 12 can contain resistor R3A, of ELG 300A, coupled to bond pad 302. Analog resistor R1A of ELG 300A can be included in dice lane 18 and coupled to stud 326A, while resistor R2A (not shown) of ELG 300A can be included in an adjacent slider (not shown). Likewise, reference resistor R2B of ELG 300B can be connected to bond pad 316 and included within slider 14. Analog resistor R1B and reference resistor R3B of ELG 300B can be included in dice lane 20 and slider 22, respectively. Analog resistor R1B is electrically coupled to stud 326B on dice lane 20, while reference resistor R3B is coupled to bond pad 314B or slider 22.

Figure 4:
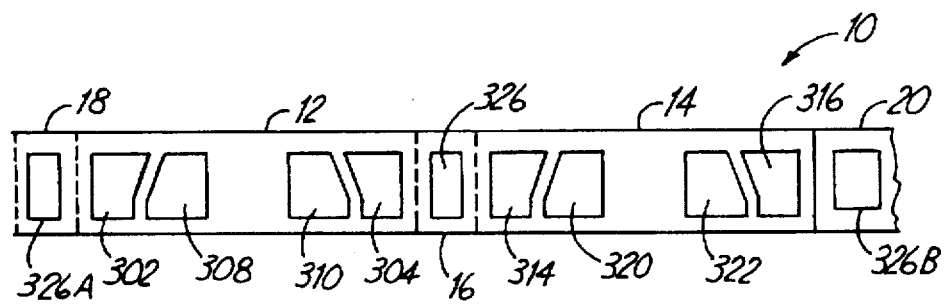
FIG. 4 is a diagrammatic top view of the bar of sliders shown in FIG. 3, which further illustrates the bond pads and other electrical connections used to access the elements of the ELG configured in accordance with preferred embodiments of the present invention.

FIG. 4 is a top view of bar 10 illustrating the electrical connections on sliders 12 and 14 and on dice lanes 16, 18 and 20. As shown in FIG. 4, slider 12 includes as electrical connections only bond pads 302, 304, 308 and 310 for use in electrically accessing the MR and/or inductive transducers, and for electrically accessing the corresponding ELG components contained in slider 12. Slider 14 includes as electrical connections only bond pads 314, 316, 320 and 322 for use in electrically accessing the transducer and ELG components contained within slider 14. No additional electrical connections are required on sliders 12 or 14 for connecting to ELG 300. The only additional electrical connection required is stud 326 in dice lane 16 for connection to analog resistor R1. Likewise, studs 326A and 326B are placed in dice lanes 18 and 20, respectively, for use in electrically accessing the corresponding ELG components of ELGs 300A and 300B. By placing only a single stud or electrical connection in each dice lane, the widths of the dice lanes can be reduced significantly, thus allowing more sliders to fit on bar 10.

Figure 5:
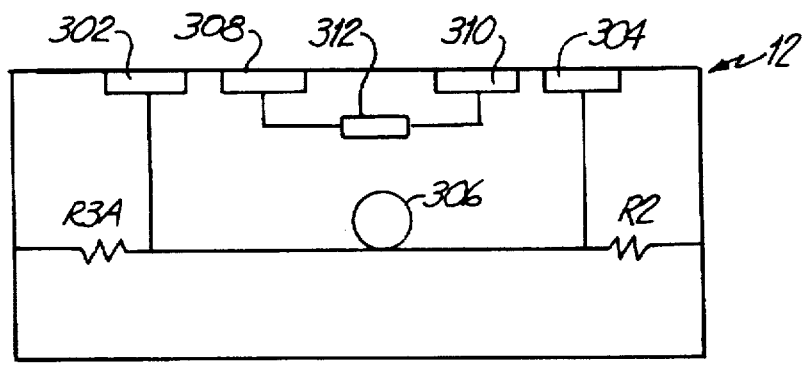
FIG. 5 is a diagrammatic view of a single slider in accordance with the present invention after being lapped and diced.

FIG. 5 is a diagrammatic view of slider 12 after the lapping and dicing process steps have been completed. Slider 12 still contains reference resistor R2 from ELG 300 and reference resistor R3A from adjacent ELG 300A. In general, in some preferred embodiments of the present invention, each slider will contain a reference resistor from each of two separate ELGs. However, in other embodiments, resistors remaining on a completed slider can correspond to the same ELG. Similarly, in yet other embodiments in which only a single reference resistor is used in each ELG, each completed slider contains only the single reference resistor for the corresponding ELG. In these two resistor type ELG configurations, three electrical connections will typically be required for measuring the resistances of the two resistors. Preferably, no analog resistors will be contained in the finished sliders so that the slider ABS will not have exposed metal or photoresist contamination.

Although the present invention has been described with reference to preferred embodiments, workers skilled in the art will recognize that changes may be made in form and detail without departing from the spirit and scope of the invention.

What is claimed is:

1. An electrical lap guide (ELG) for use in lapping a bar of magnetic transducer carrying sliders to a desired height, comprising:

a first ELG element positioned in a first dice lane on the bar between first and second sliders;

a first electrical connection positioned on the first dice lane for coupling the first ELG element to external circuitry;

a second ELG element positioned in the first slider; and a second electrical connection positioned on the first slider for coupling the second ELG element to external circuitry.

2. The ELG of claim 1 wherein the first and second ELG elements include resistive elements.

3. The ELG of claim 2, wherein the first ELG element includes an analog resistive element positioned in the first dice lane at a lapped surface of the bar, wherein a resistance of the first ELG element changes as the bar is lapped.

4. The ELG of claim 3, wherein the lapped surface of the bar corresponds to air bearing surfaces of the first and second sliders.

5. The ELG of claim 4, wherein the second ELG element includes a reference resistive element which is located at a position within the first slider recessed away from the lapped surface of the bar.

6. The ELG of claim 5, wherein the first slider includes a first transducer positioned therein and a first bond pad positioned at a surface of the first slider coupled to the first transducer, wherein the first bond pad is also coupled to the second ELG element and functions as the second electrical connection.

7. The ELG of claim 6 and further comprising:

a third ELG element positioned in the second slider; and a third electrical connection positioned on the second slider for coupling the third ELG element to external circuitry.

8. The ELG of claim 7, wherein the second slider has a second transducer positioned therein and a second bond pad positioned at a surface of the second slider coupled to the second transducer, wherein the second bond pad is also coupled to the third ELG element and acts as the third electrical connection.

9. The ELG of claim 8, wherein the first ELG element is electrically coupled to each of the second and third ELG elements.

10. The ELG of claim 6, wherein the first transducer is an inductive transducer.

11. The ELG of claim 6, wherein the first transducer is a magnetoresistive transducer.

12. A slider containing bar for lapping at a lapped surface to obtain a desired height, the bar comprising:

a first slider having a first transducer contained therein and electrically coupled to a first bond pad at a surface of the first slider, the first slider also having a first resistive element of a first electrical lap guide contained therein, wherein the first resistive element of the first electrical lap guide is electrically coupled to the first bond pad; and a first dice lane positioned adjacent a first side of the first slider, the first dice lane having a second resistive element of the first electrical lap guide contained therein, wherein the second resistive element of the first electrical lap guide is coupled to a first electrical connection at a surface of the first dice lane, and wherein the second resistive element is electrically coupled to the first resistive element.

13. The slider containing bar of claim 12, and further comprising a second slider having a second transducer contained therein and electrically coupled to a second bond pad at a surface of the second slider, the second slider also having a third resistive element of the first electrical lap guide contained therein, wherein the third resistive element of the first electrical lap guide is electrically coupled to the second bond pad, and wherein the third resistive element is electrically coupled to each of the first and second resistive elements of the first electrical lap guide.

14. The slider containing bar of claim 12, wherein the first resistive element is recessed from the lapped surface such that the first resistive element is not exposed to the lapped surface during lapping.

15. The slider containing bar of claim 14, wherein the second resistive element is positioned in the first dice lane adjacent the lapped surface such that the second resistive element is exposed to the lapped surface during lapping.

16. The slider containing bar of claim 14, wherein the first transducer is an inductive transducer.

17. The slider containing bar of claim 14, wherein the first transducer is a magnetoresistive transducer.

18. An electrical lap guide (ELG) for use in lapping a bar of magnetic transducer carrying sliders to a desired height, comprising:

a first ELG element positioned in a first dice lane on the bar between first and second sliders;

a first electrical connection positioned on the first dice lane for coupling the first ELG element to external circuitry;

a second ELG element positioned in the first slider, wherein the second ELG element is electrically coupled to the first ELG element;

a second electrical connection positioned on the first slider for coupling the second ELG element to external circuitry;

a third ELG element positioned in the second slider, wherein the third ELG element is electrically coupled to the first and second ELG elements; and a third electrical connection positioned on the second slider for coupling the third ELG element to external circuitry.

19. The ELG of claim 18, wherein the first ELG element includes an analog resistive element positioned in the first dice lane at a lapped surface of the bar such that a resistance of the first ELG element changes as the bar is lapped, and wherein the second and third ELG elements include reference resistive elements which are located at positions within the respective first and second sliders recessed away from the lapped surface of the bar.

* * * * *